(12) United States Patent
Damnjanovic et al.

(10) Patent No.: US 9,036,564 B2
(45) Date of Patent: May 19, 2015

(54) DYNAMIC ASSIGNMENT OF ACK RESOURCE IN A WIRELESS COMMUNICATION SYSTEM

(75) Inventors: Aleksandar Damnjanovic, Del Mar, CA (US); Jelena M. Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1242 days.

(21) Appl. No.: 12/403,327

(22) Filed: Mar. 12, 2009

(65) Prior Publication Data

US 2009/0245194 A1 Oct. 1, 2009

Related U.S. Application Data

(60) Provisional application No. 61/040,609, filed on Mar. 28, 2008.

(51) Int. Cl.
*H04W 4/00* (2009.01)
*H04J 3/00* (2006.01)
(Continued)

(52) U.S. Cl.
CPC ........... *H04W 72/042* (2013.01); *H04L 1/0028* (2013.01); *H04L 1/1607* (2013.01); *H04L 1/1819* (2013.01); *H04L 1/1861* (2013.01); *H04L 5/0007* (2013.01);
(Continued)

(58) Field of Classification Search
None
See application file for complete search history.

(56) References Cited

U.S. PATENT DOCUMENTS

| 6,452,941 B1 | 9/2002 | Bruhn |
| 2006/0205414 A1 | 9/2006 | Teague |

(Continued)

FOREIGN PATENT DOCUMENTS

| CN | 101137098 A | 3/2008 |
| EP | 1349292 A2 | 10/2003 |

(Continued)

OTHER PUBLICATIONS

Fredrik Persson: "Voice over IP Realized for the 3GPP Long Term Evolution" IEEE Vehicular Technology Conference, Sep. 1, 2007, pp. 1436-1440, XP031147644 IEEE, PI ISBN: 978-1-4244-0263-2 abstract sections V.C, V.E, VII, VIII.

(Continued)

*Primary Examiner* — Chirag Shah
*Assistant Examiner* — Srinivasa Reddivalam
(74) *Attorney, Agent, or Firm* — Tyler J. Overall

(57) ABSTRACT

Techniques for dynamically assigning acknowledgement (ACK) resource to a user equipment (UE) are described. For dynamic scheduling, a scheduling message may be used to send scheduling information for a single transmission of data. For semi-persistent scheduling, a scheduling message may be used to send a semi-persistent assignment for multiple transmissions of data. In an aspect, at least one field of a scheduling message, which is normally used to carry scheduling information for dynamic scheduling, may be re-used to carry an ACK resource assignment for semi-persistent scheduling. In one design, a UE may receive a scheduling message carrying a semi-persistent assignment and may obtain an assignment of ACK resource from the at least one field of the scheduling message. The UE may receive a transmission of data sent in accordance with the semi-persistent assignment, determine ACK information for the transmission of data, and send the ACK information with the ACK resource.

39 Claims, 10 Drawing Sheets

(51) Int. Cl.
*H04W 72/04* (2009.01)
*H04L 1/16* (2006.01)
*H04L 1/00* (2006.01)
*H04L 1/18* (2006.01)
*H04L 5/00* (2006.01)
*H04L 25/03* (2006.01)

(52) U.S. Cl.
CPC ............ *H04L 5/0053* (2013.01); *H04L 5/0062* (2013.01); *H04L 5/0064* (2013.01); *H04L 5/0091* (2013.01); *H04L 25/03866* (2013.01)

(56) References Cited

U.S. PATENT DOCUMENTS

| | | | | |
|---|---|---|---|---|
| 2007/0097981 | A1* | 5/2007 | Papasakellariou | 370/394 |
| 2008/0117891 | A1 | 5/2008 | Damnjanovic et al. | |
| 2009/0109906 | A1* | 4/2009 | Love et al. | 370/329 |
| 2009/0109912 | A1* | 4/2009 | DiGirolamo et al. | 370/329 |
| 2009/0138598 | A1* | 5/2009 | Shrivastava et al. | 709/226 |

FOREIGN PATENT DOCUMENTS

| | | |
|---|---|---|
| RU | 2231227 | 6/2004 |
| WO | WO2008024788 | 2/2008 |

OTHER PUBLICATIONS

International Search Report & Written Opinion—PCT/US2009/038656, International Search Authority—European Patent Office—May 21, 2012.
Nokia et al: "PHICH and mapping to PHICH groups" 3GPP Draft; R1-080927, 3rd Generation Partnership Project (3GPP), vol. RAN WG1, No. Sorrento, Italy; Feb. 6, 2008, XP050109400, Mobile Competence Centre; 650, Route Des Lucioles; F-06921 Sophia-Antipolis Cedex; France, figures 1-3 sections 2, 3.
Partial Search Report—PCT/US2009/038656—International Search Authority—European Patent Office, Apr. 9, 2010.
European Search Report—EP11159602—Search Authority—The Hague—Apr. 5, 2011.
Huawei: "Relation between UL ACK/NACK and DL CCE" 3GPP Draft; R1-074063, 3rd Generation Partnership Project (3GPP), Mobile Competence Centre ; 650, Route Des Lucioles ; F-06921 Sophia-Antipolis Cedex; France, vol. RAN WG1, No. Shanghai, China; Oct. 2, 2007, XP050107604.
Motorola, "E-UTRA Uplink L1/L2 Control Channel Mapping", 3GPP Draft; R1-062626 UL L1 L2 Control Mapping, 3rd Generation Partnership Project (3GPP), Mobile Competence Centre; 650, Route Des Lucioles; F-06921 Sophia-Antipolis Cedex; Francia, vol. RAN WG1, No. Seoul, Corea; Oct. 4, 2006, XP050103126.
Ericsson, "R2-062859: Semi Persistent Scheduling," Oct. 2006, pp. 1-15, Internet Citation, XP002496512.
NTT DoCoMo, Inc., "UL ACK/NACK resource allocation for DL semi-persistent scheduling", 3GPP TSG RAN WG2 Meeting #61bis, R2-081857, pp. 1-4, Apr. 4, 2008.
Philips, et.al., "Control of E-UTRAN UL Scheduling", 3GPP TSG RAN WG2 Meeting #59bis, R2-074355, pp. 1-4, Oct. 12, 2007.
Samsung et al.,"UL ACK/NACK resource indication for DL persistent scheduling", 3GPP Draft; R1-080681 UL Persistent ACKNACK Indication and Use, 3rd Generation Partnership Project (3GPP), Mobile Competence Centre ; 650, Route Des Lucioles ; F-06921 Sophia-Antipolis Cedex; France, vol. RAN WGI, No. Sorrento, Italy; Feb. 5, 2008, XP050109177, [retrieved on Feb. 5, 2008].
Taiwan Search Report—TW098110445—TIPO—Jan. 26, 2013.
Ericsson et al., "Control of semi persistent scheduling", TSG-RAN WG2 Meeting #61, R2-080765, Sorrento, Italy, Feb. 11-15, 2008.
European Search Report—EP13158370—Search Authority—The Hague—Jul. 18, 2013.
Qualcomm Europe, "Details on Semi-Persistent Scheduling Activation with Single PDCCH", 3GPP TSG RAN WG1 Meeting #53bis, R1-082542, pp. 1-6, Jun. 30-Jul. 4, 2008.
Qualcomm Europe: "Details on UL Power Control", 3GPP, TSG-RAN WG1 #50-bis, R1-073930, pp. 1-4.

* cited by examiner

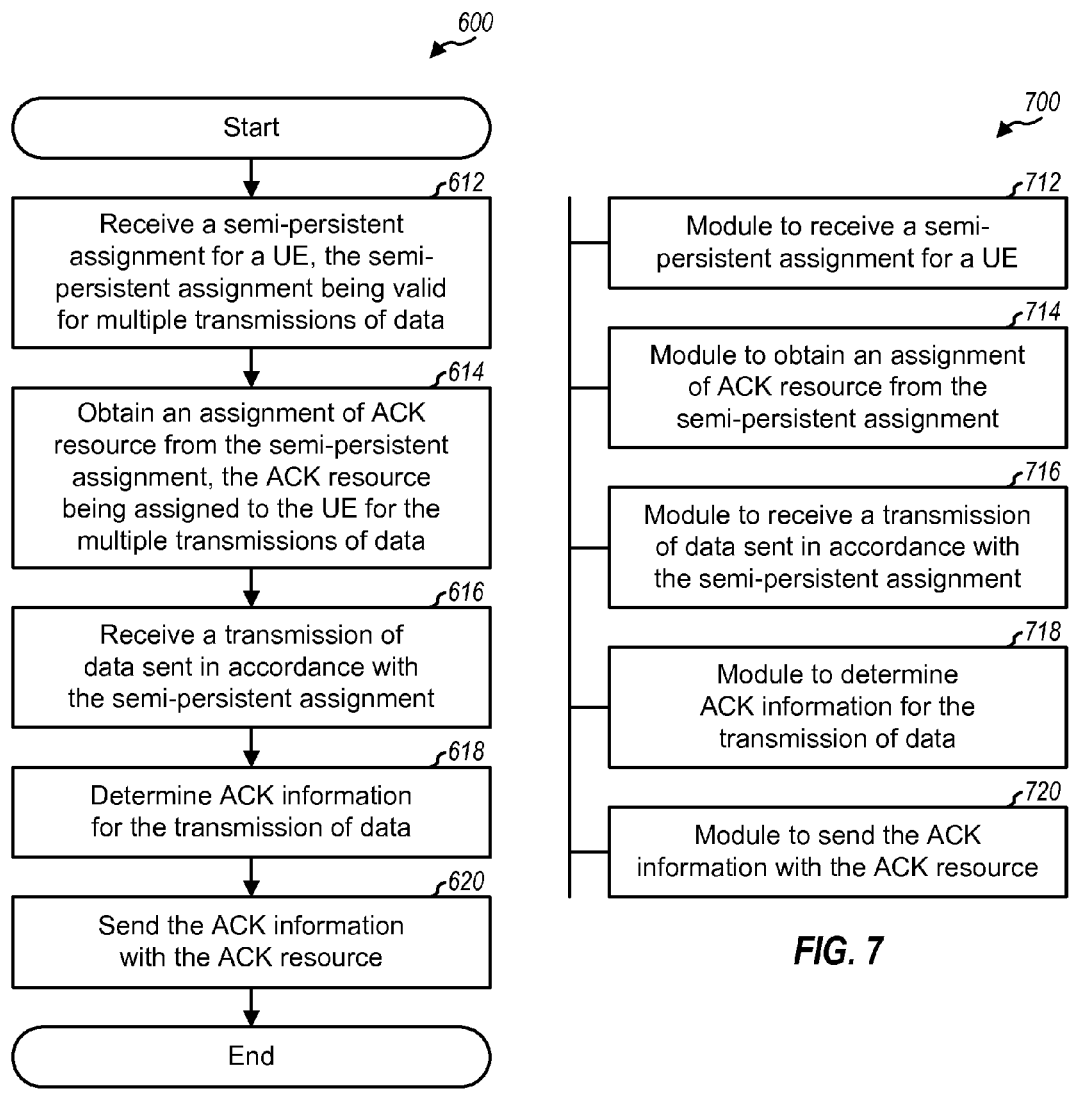

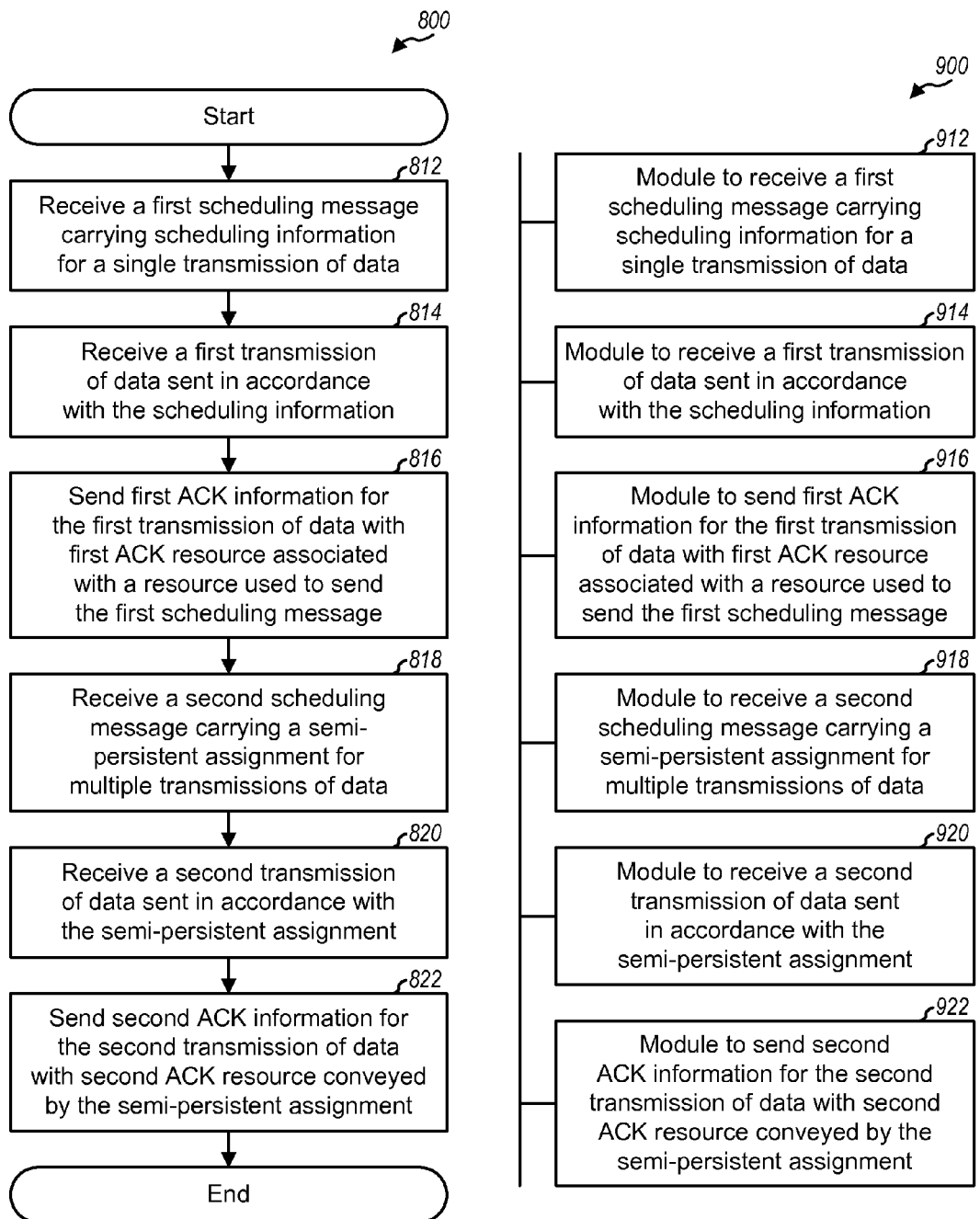

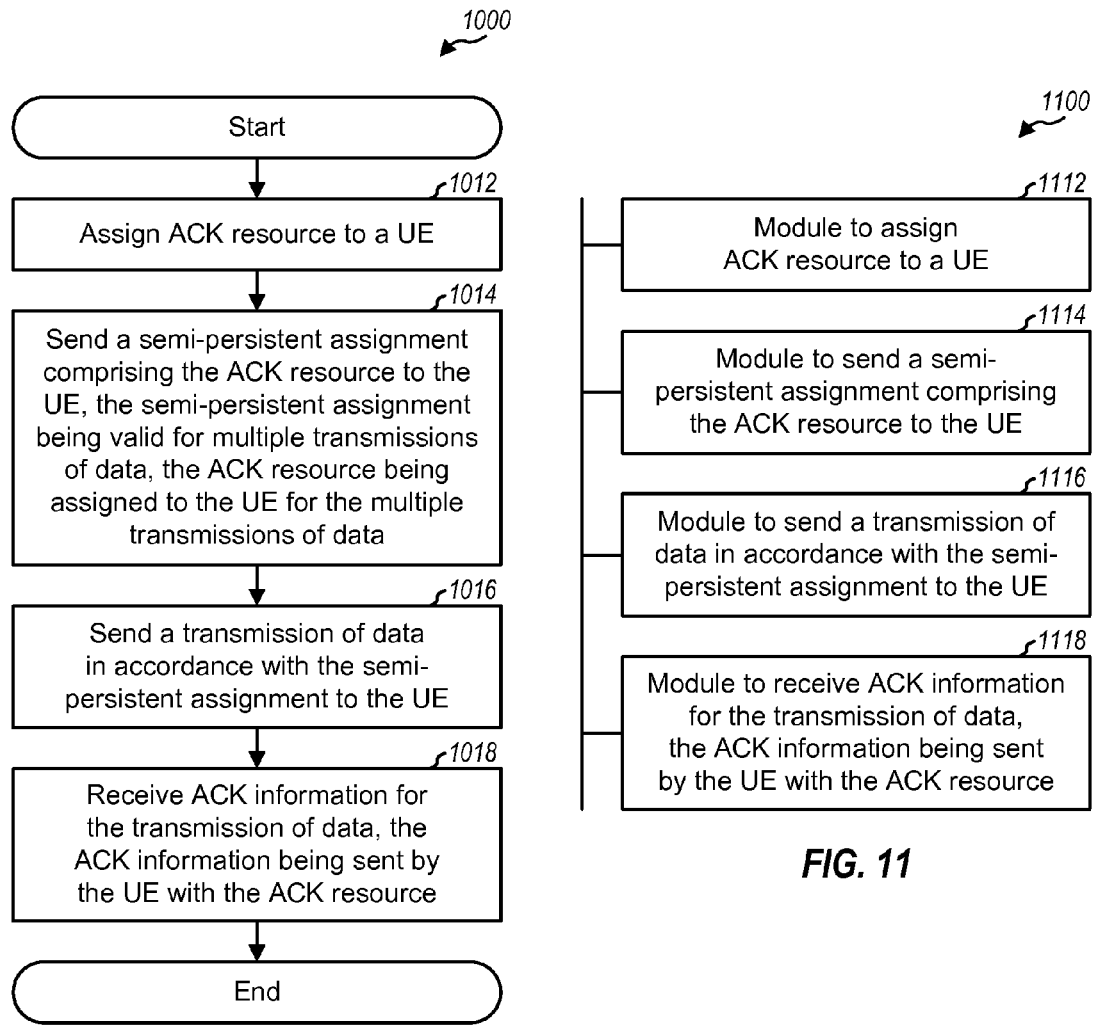

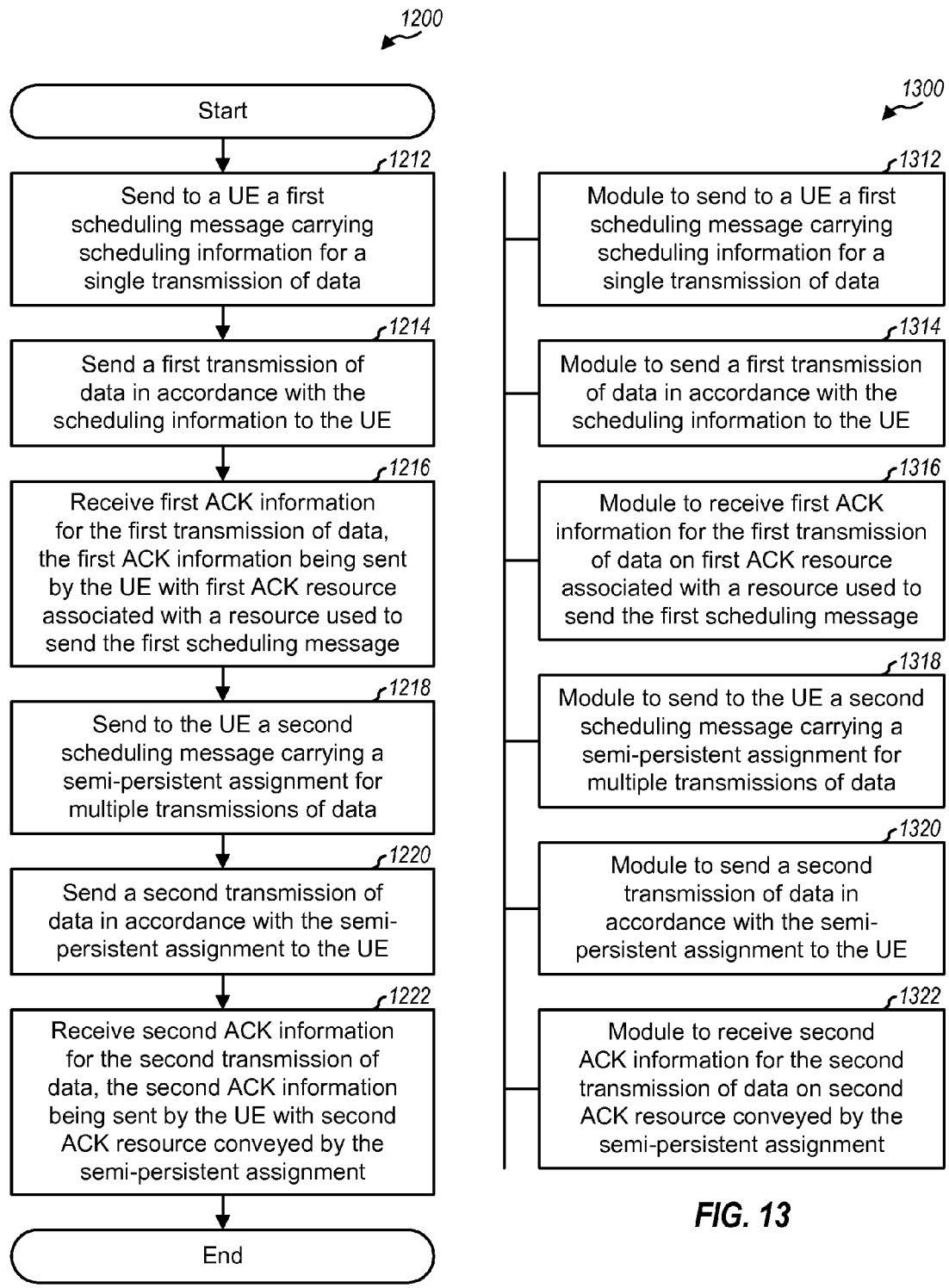

DYNAMIC ASSIGNMENT OF ACK RESOURCE IN A WIRELESS COMMUNICATION SYSTEM

The present application claims priority to provisional U.S. Application Ser. No. 61/040,609, entitled "Dynamic Scheduling of UL-ACK," filed Mar. 28, 2008, assigned to the assignee hereof and incorporated herein by reference.

BACKGROUND

I. Field

The present disclosure relates generally to communication, and more specifically to techniques for assigning resources in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may include a number of Node Bs that can support communication for a number of user equipments (UEs). A Node B may communicate with a UE on the downlink and uplink. The downlink (or forward link) refers to the communication link from the Node B to the UE, and the uplink (or reverse link) refers to the communication link from the UE to the Node B. The Node B may send a transmission of data to the UE. The UE may decode the transmission of data and may send acknowledgement (ACK) information to the Node B. The ACK information may indicate whether the transmission of data was decoded correctly or in error by the UE. The Node B may determine whether to send a retransmission of data or a new transmission of data to the UE based on the ACK information. It may be desirable to efficiently assign ACK resource to the UE for use to send the ACK information.

SUMMARY

Techniques for dynamically assigning ACK resource to a UE in a wireless communication system are described herein. The system may support dynamic scheduling and semi-persistent scheduling. For dynamic scheduling, a scheduling message may be used to send scheduling information for a single transmission of data. For semi-persistent scheduling, a scheduling message may be used to send a semi-persistent assignment for multiple transmissions of data.

In an aspect, at least one field of a scheduling message, which is normally used to carry scheduling information for dynamic scheduling, may be re-used to carry an ACK resource assignment for semi-persistent scheduling. The at least one field may include a new data indicator field, a redundancy version field, a modulation and coding scheme (MCS) field, a transmit power control (TPC) command field, etc.

In one design, a UE may receive a scheduling message carrying a semi-persistent assignment and may obtain an assignment of ACK resource from the semi-persistent assignment. The UE may obtain an index of the ACK resource from at least one field of the scheduling message and may determine the ACK resource based on the index. The UE may receive a transmission of data sent in accordance with the semi-persistent assignment, determine ACK information for the transmission of data, and send the ACK information with the ACK resource.

In another design, a UE may receive a first scheduling message carrying scheduling information for dynamic scheduling and may receive a first transmission of data sent in accordance with the scheduling information. The UE may send ACK information for the first transmission of data with first ACK resource associated with a resource used to send the first scheduling message. The UE may receive a second scheduling message carrying a semi-persistent assignment for semi-persistent scheduling. The UE may receive a second transmission of data sent in accordance with the semi-persistent assignment. The UE may send ACK information for the second transmission of data with second ACK resource conveyed by the semi-persistent assignment. ACK resources may thus be conveyed in different manners for dynamic scheduling and semi-persistent scheduling.

Various aspects and features of the disclosure are described in further detail below.

BRIEF DESCRIPTION OF THE DRAWINGS

FIGS. 6 and 7 show a process and an apparatus, respectively, for receiving data with semi-persistent scheduling.

FIGS. 8 and 9 show a process and an apparatus, respectively, for receiving data with dynamic scheduling and semi-persistent scheduling.

FIGS. 10 and 11 show a process and an apparatus, respectively, for sending data with semi-persistent scheduling.

FIGS. 12 and 13 show a process and an apparatus, respectively, for sending data with dynamic scheduling and semi-persistent scheduling.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). The techniques described herein may be used for the systems and radio technologies mentioned above as well as other systems and radio technologies. For clarity, certain aspects of the techniques are described below for LTE, and LTE terminology is used in much of the description below.

Figure 1:
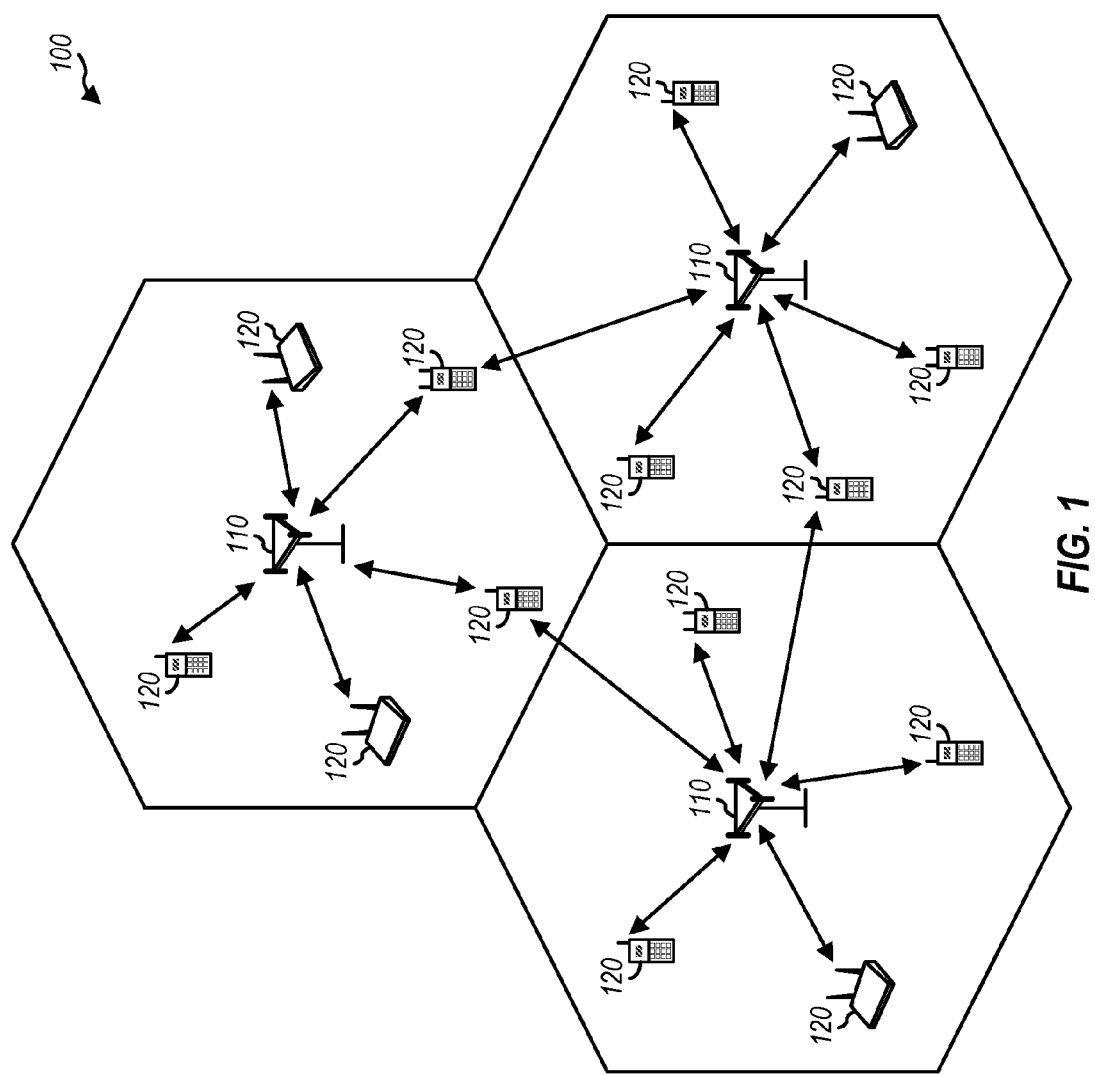
FIG. 1 shows a wireless communication system.

FIG. 1 shows a wireless communication system 100, which may be an LTE system. System 100 may include a number of Node Bs 110 and other network entities. A Node B may be a station that communicates with the UEs and may also be referred to as an evolved Node B (eNB), a base station, an access point, etc. UEs 120 may be dispersed throughout the system, and each UE may be stationary or mobile. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc.

The system may support data transmission with hybrid automatic retransmission (HARQ). For HARQ on the downlink, a Node B may send a transmission of a transport block and may send one or more additional transmissions of the transport block (if needed) until the transport block is decoded correctly by a recipient UE, or the maximum number of transmissions has been sent, or some other termination condition is encountered. A transport block may also be referred to as a packet, a data block, etc. The first transmission of a transport block may be referred to as a new transmission, and each additional transmission of the transport block may be referred to as a retransmission.

The system may also support dynamic scheduling and semi-persistent scheduling for data transmission. For dynamic scheduling, scheduling information may be sent with each transmission of data and may convey parameters and resources used for that transmission of data. For semi-persistent scheduling, scheduling information may be sent once and may be applicable for multiple transmissions of data. Dynamic scheduling may provide flexibility whereas semi-persistent scheduling may reduce signaling overhead.

Figure 2:
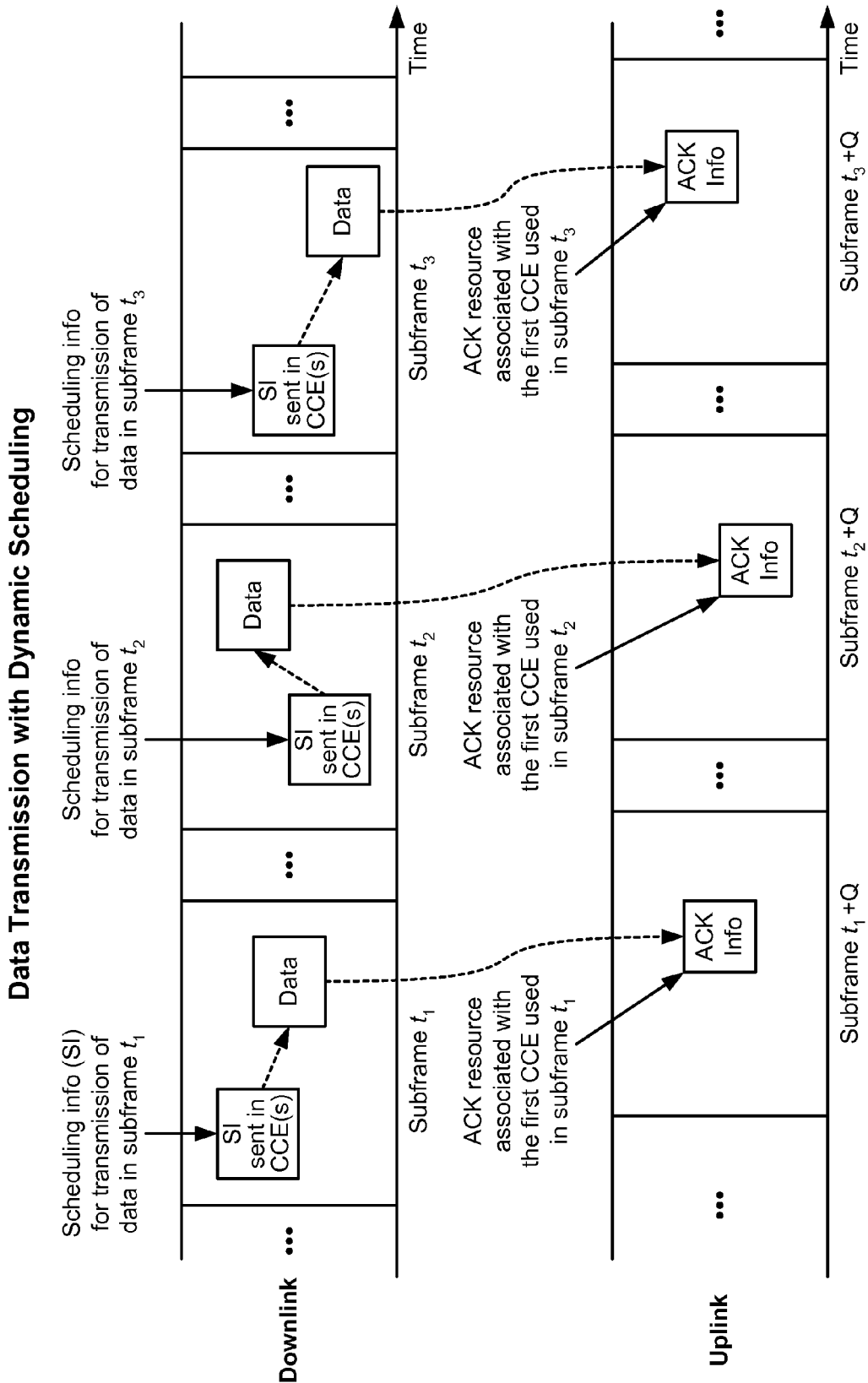
FIG. 2 shows data transmission with dynamic scheduling.

FIG. 2 shows an exemplary data transmission on the downlink with dynamic scheduling. The transmission timeline for each link may be partitioned into units of subframes. Each subframe may have a particular duration, e.g., one millisecond (ms). For frequency division duplexing (FDD) as shown in FIG. 2, the downlink (DL) and uplink (UL) may be allocated separate frequency channels. Different transmissions may be sent concurrently via the downlink and uplink on the separate frequency channels. A Node B may have data to send to a UE and may send scheduling information on a physical downlink control channel (PDCCH) in subframe $t_1$. The scheduling information may be sent in one or more control channel elements (CCEs) and may include various parameters described below. The Node B may send a transmission of one or more transport blocks on a physical downlink shared channel (PDSCH) in subframe $t_1$. The Node B may send the transport block(s) in one or more resource blocks and in accordance with parameters conveyed by the scheduling information.

The UE may receive the scheduling information from the PDCCH and may process the transmission on the PDSCH in accordance with the scheduling information to recover the transport block(s) sent by the Node B. The UE may generate ACK information (or UL-ACK), which may indicate whether each transport block was decoded correctly or in error by the UE. The UE may send the ACK information on a physical uplink control channel (PUCCH) in subframe $t_1+Q$, where Q may be equal to 2, 4 or some other value. Q is a subframe offset between the data transmission on the downlink and the corresponding ACK transmission on the uplink. The Node B may receive the ACK information from the UE and may send a retransmission of each transport block decoded in error.

The UE may send the ACK information with ACK resource, which may also be referred to as PUCCH resource, ACK channel, etc. The ACK resource may be associated with radio resource, code resource (e.g., an orthogonal sequence, a reference signal sequence, etc.), and/or other resources used to send ACK information. For example, in LTE, the ACK resource may be given by an ACK index n(1)_PUCCH and may be associated with (i) a time-frequency location (e.g., a resource block) on which to send ACK information, (ii) a cyclic shift of a Zardoff-Chu sequence used for spreading the ACK information in the frequency domain, and (iii) an orthogonal or Walsh spreading sequence used for spreading the ACK information in the time domain.

For dynamic scheduling, the ACK resource to use by the UE may be determined as follows:

$$n_{PUCCH} = n_{CCE} + N_{PUCCH}, \quad \text{Eq (1)}$$

where $n_{CCE}$ is an index of the first CCE used to send scheduling information, $n_{PUCCH}$ is an index of the ACK resource, and $N_{PUCCH}$ is a parameter configured by higher layers.

$N_{PUCCH}$ may be configured by Radio Resource Control (RRC) and broadcast to UEs. For dynamic scheduling, the ACK resource may be linked to the first CCE carrying the scheduling information, e.g., as shown in equation (1). The ACK resource may thus be implicitly conveyed via the scheduling information, and no additional overhead is consumed to send the ACK resource assignment to the UE.

For dynamic scheduling, each transmission of data may occur as described above. For each transmission of data, the Node B may send scheduling information in one or more CCEs and may send a transmission of one or more transport blocks in one or more resource blocks conveyed by the scheduling information. The UE may send ACK information with the ACK resource determined based on the first CCE carrying the scheduling information.

Figure 3:
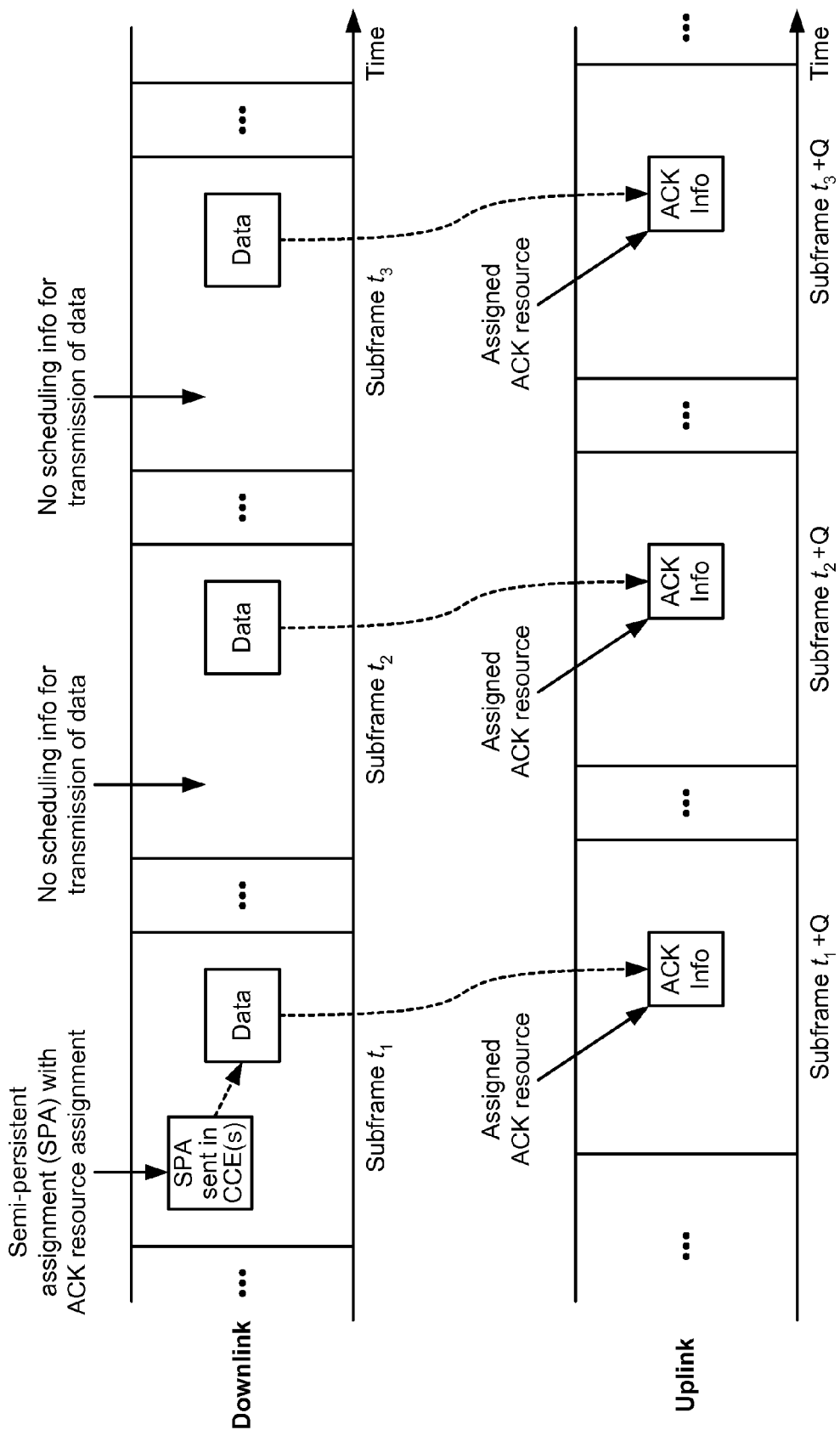
FIG. 3 shows data transmission with semi-persistent scheduling.

FIG. 3 shows an exemplary data transmission on the downlink with semi-persistent scheduling. A Node B may send a semi-persistent assignment or grant on the PDCCH in subframe $t_1$. The semi-persistent assignment may include various parameters for transmissions of data on the downlink as well as an ACK resource assignment for the uplink. In one design, upper layers (e.g., RRC) may configure a set of ACK resources, and the ACK resource assignment may comprise an index for an ACK resource in the set of configured ACK resources. In another design, the ACK resource assignment may assign any available ACK resource.

The Node B may send a transmission of one or more transport blocks on the PDSCH in subframe $t_1$. The Node B may send the transport block(s) in one or more resource blocks and in accordance with parameters conveyed by the semi-persistent assignment. The UE may receive the semi-persistent assignment from the PDCCH and may process the transmission on the PDSCH in accordance with the semi-persistent assignment to recover the transport block(s) sent by the Node B. The UE may generate ACK information for the transport block(s) and may send the ACK information in subframe $t_1+Q$. The ACK information may be sent with the ACK resource conveyed by the semi-persistent assignment.

For semi-persistent scheduling, the semi-persistent assignment may be sent once with the first transmission of data and may be valid for a predetermined time period or until the semi-persistent assignment is revoked. The ACK resource assignment would be valid for the entire semi-persistent scheduling interval, which is the duration in which the semi-persistent assignment is valid. The Node B may send new transmissions of data in accordance with the semi-persistent assignment, without having to send any scheduling information, during the semi-persistent scheduling interval. The UE may send ACK information for each new transmission of data received from the Node B using the ACK resource provided by the semi-persistent assignment. For example, the Node B may send new transmissions at a periodic rate in subframes $t_1$, $t_2 = t_1 + M$, $t_3 = t_1 + 2M$, . . . , and $t_L = t_1 + L \cdot M$, where parameters M and L and/or the semi-persistent scheduling interval may be configured. For example, in LTE, parameter M may be configured by upper layers (e.g., RRC). The UE may send ACK information in corresponding subframes $t_1 + Q$, $t_2 + Q$, $t_3 + Q$, . . . , and $t_L + Q$ with the assigned ACK resource.

The Node B may also send retransmissions of data during the semi-persistent scheduling period and may send scheduling information for each retransmission of data, e.g., in the same manner as for dynamic scheduling. The UE may send ACK information for each retransmission of data with the ACK resource associated with the first CCE carrying the scheduling information for that retransmission.

In an aspect, an ACK resource assignment for semi-persistent scheduling may be sent by re-using at least one existing field of a scheduling message. The scheduling message may include a number of fields to carry scheduling information for dynamic scheduling. To simplify operation, the scheduling message may also be used to send a semi-persistent assignment for semi-persistent scheduling. At least one field normally used to carry scheduling information for dynamic scheduling may be re-used to carry an ACK resource assignment for semi-persistent scheduling.

Various formats may be defined for the scheduling message and may be applicable for different operating scenarios. Each format may include a specific set of fields for a set of parameters for scheduling information.

Figure 4:
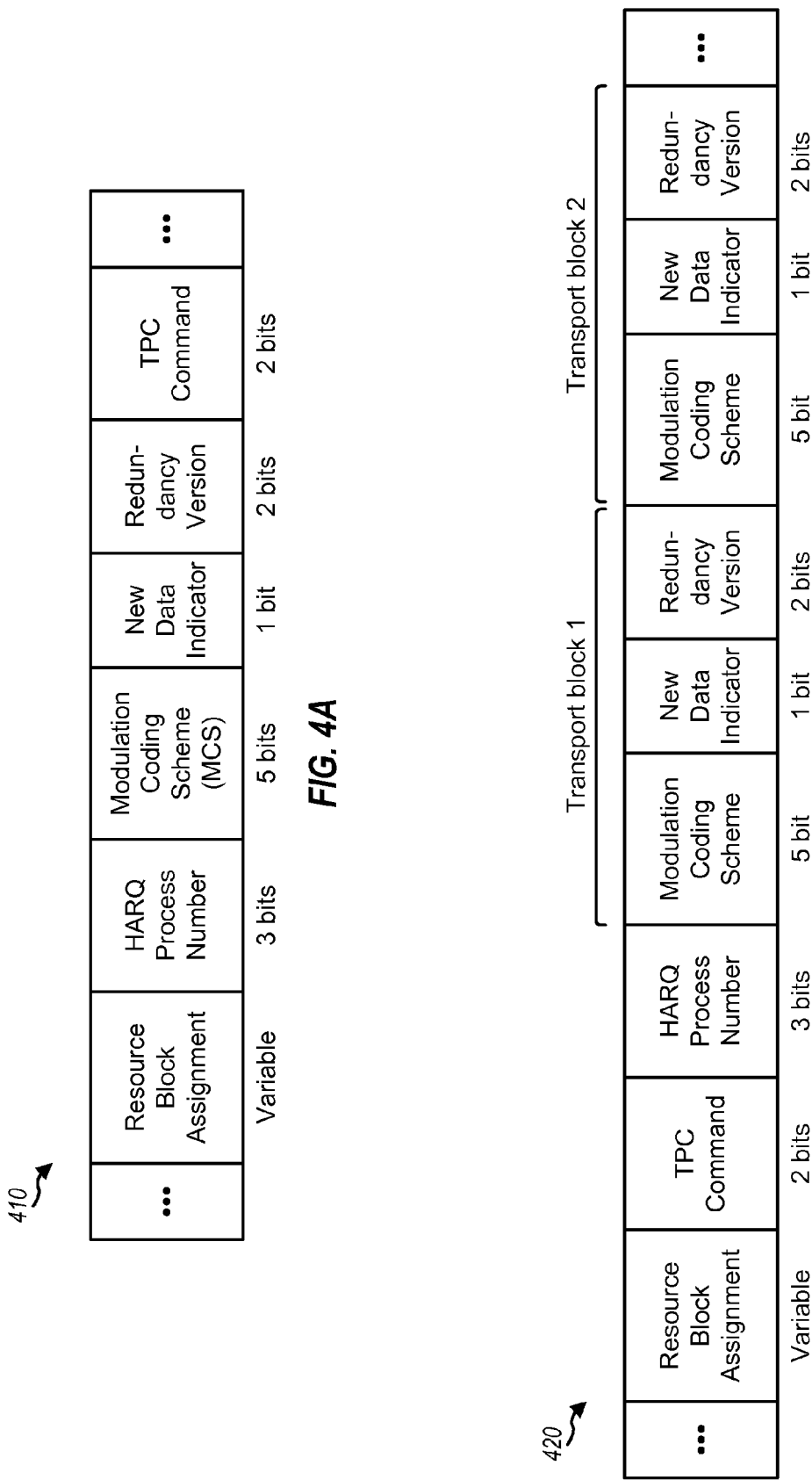
FIGS. 4A and 4B show two scheduling messages with different formats.

FIG. 4A shows a scheduling message 410 in accordance with Formats 1 and 1A defined by LTE. Formats 1 and 1A may be used to schedule transmission of one transport block on the PDSCH. Message 410 includes a resource block assignment field, an HARQ process number field, a modulation and coding scheme (MCS) field, a new data indicator field, a redundancy version field, and a transmit power control (TPC) command field. The redundancy version field and the new data indicator field may be considered as belonging in a retransmission sequence number field. Message 410 may also include other fields, which are not shown in FIG. 4A for simplicity.

For HARQ, a number of HARQ processes may be defined. Each HARQ process may be used to send a new transmission and all retransmissions of a transport block. An HARQ process may be started for a transport block if the HARQ process is available and may terminate when the transport block is decoded correctly. The transport block may be encoded in accordance with an MCS selected for the transport block to obtain a codeword. The codeword may be partitioned into multiple redundancy versions, and each redundancy version may contain different encoded information (or code bits) for the transport block. A Node B may select one redundancy version to send for a transmission of the transport block.

Table 1 lists the fields of scheduling message 410 and provides a short description for each field. Table 1 also gives the size of each field in number of bits.

TABLE 1

Scheduling Message

| Fields | Size | Description |
| --- | --- | --- |
| Resource block assignment | variable | Indicate resource block(s) used to send a transport block. |
| HARQ process number | 3 bits | Indicate HARQ process on which the transport block is sent. |
| Modulation and coding scheme | 5 bits | Indicate modulation scheme and code rate for the transport block. |
| New data indicator | 1 bit | Indicate whether the current transmission is a retransmission of the transport block. |
| Redundancy version | 2 bits | Indicate redundancy version being sent for the transport block. |
| TPC command | 2 bits | Indicate transmit power adjustment for the PUCCH sent by a recipient UE. |

FIG. 4B shows a scheduling message 420 in accordance with Formats 2 and 2A defined by LTE. Formats 2 and 2A may be used to schedule a transmission of one or two transport blocks on the PDSCH in a spatial multiplexing mode. Message 420 includes a resource block assignment field, a TPC command field, an HARQ process number field, and two sets of fields for two transport blocks. Each set includes an MCS field, a new data indicator field, and a redundancy version field. Message 420 may also include other fields, which are not shown in FIG. 4B for simplicity. The fields in message 420 are described in Table 1.

FIGS. 4A and 4B show two formats that may be used for sending scheduling information. Other formats may also be used and may include different fields than those shown in FIGS. 4A and 4B. For clarity, much of the description below refers to scheduling messages 410 and 420.

For dynamic scheduling, message 410 or 420 may be used to send scheduling information for a transmission of data. A suitable scheduling message may be selected based on whether one or multiple transport blocks are sent and/or other considerations. For semi-persistent scheduling, message 410 or 420 may be used to send a semi-persistent assignment with the first transmission of data. At least one field of message 410 or 420 may be used to send an ACK resource assignment. In general, any field(s) may be used to send the ACK resource assignment. However, it may be desirable to select a field that is not relevant (or not as relevant) for semi-persistent scheduling. For example, a field that may be less applicable for the first transmission of data and/or may have little adverse effect on performance may be selected. The number of fields to select may be dependent on the number of bits needed to send the ACK resource assignment.

In one design, an ACK resource assignment may be sent in the new data indicator field, the redundancy version field, and the TPC command field. In the design shown in FIGS. 4A and 4B, five bits are available for these three fields. Up to 32 ACK resources may be configured or defined and assigned indices of 0 to 31. The configured ACK resources may be broadcast to the UEs or known a priori by the UEs. A 5-bit ACK resource index for one of up to 32 possible ACK resources may be sent in the three fields to a UE. The UE may obtain the ACK resource index from the three fields and may determine the ACK resource assigned to the UE based on the ACK resource index and the configured ACK resources. The UE may use the ACK resource to send ACK information during the semi-persistent scheduling period.

In another design, an ACK resource assignment may be sent in the new data indicator field, the redundancy version field, the TPC command field and all or a subset of the MCS field. For example, two bits in the MCS field may be used in conjunction with the five bits from the other three fields. Up to 128 ACK resources may then be configured with the seven bits in the four fields. A 7-bit ACK resource index for one of up to 128 configured ACK resources may be sent in the four fields to a UE. The MCS field can normally convey one of up to 32 MCS values for dynamic scheduling. A set of 8 MCS values may be supported for semi-persistent scheduling and may be configured by higher layers, e.g., RRC. One MCS value may be selected from the set of 8 MCS values and may be conveyed with three remaining bits in the MCS field. As another example, up to 64 ACK resources may be configured with five bits in the three fields and one bit in the MCS field. A set of 16 MCS values may be supported for semi-persistent scheduling, and one MCS value may be selected and conveyed with four remaining bits in the MCS field.

In yet another design, an ACK resource assignment may be sent using two bits in the new data indicator field and the redundancy version field, one bit in the TPC command field, and three bits in the MCS field. Up to 64 ACK resources may be configured with the six bits in the four fields. A 6-bit ACK resource index for one of up to 64 configured ACK resources may be sent using the six bits in the four fields to a UE.

In yet another design, an ACK resource assignment may be sent in the TPC command field. Two bits are available in the TPC command field. Hence, up to four ACK resources may be configured and assigned indices of 0 to 3. A 2-bit ACK resource index for one of up to four configured ACK resources may be sent in the TPC command field to a UE.

In general, any combination of fields and/or bits may be used to send an ACK resource assignment for semi-persistent scheduling. If N bits are available to send the ACK resource assignment, then up to $2^N$ ACK resources may be configured (e.g., by RRC) and may be assigned indices of 0 through $2^N-1$. The configured ACK resources may be broadcast to the UEs or known a priori by the UEs. An N-bit ACK resource index for an assigned ACK resource may be sent using the N available bits.

A scheduling message may carry scheduling information for dynamic scheduling or a semi-persistent assignment for semi-persistent scheduling. Various mechanisms may be used to indicate whether the scheduling message is sent for dynamic scheduling or semi-persistent scheduling. In one design, different scrambling mechanisms may be used for the scheduling message for dynamic scheduling and semi-persistent scheduling. In another design, the scheduling message may include a special bit to indicate whether the message is for dynamic scheduling or semi-persistent scheduling.

In yet another design, a designated cell radio network temporary identifier (C-RNTI), which may be referred to as a semi-persistent C-RNTI, may be used to indicate a semi-persistent assignment. Each UE in a given cell may be assigned a unique C-RNTI for use as a UE identity for that cell. Each UE that has semi-persistent scheduling enabled may also be assigned a unique semi-persistent C-RNTI. A Node B may send a scheduling message to a specific UE for dynamic scheduling by using the normal C-RNTI for the UE or for semi-persistent scheduling by using the semi-persistent C-RNTI for the UE. Each UE may detect for scheduling messages from the Node B with the normal C-RNTI for that UE. Each UE that has semi-persistent scheduling enabled may also detect for scheduling messages with the semi-persistent C-RNTI for that UE.

In one design, unused fields and/or unused bits in a scheduling message for semi-persistent scheduling may be set to designated values. For example, the new data indicator field, the HARQ process number field, and the redundancy version field of the scheduling message may be set to designated values of all zeros for semi-persistent scheduling. The designated values may be used by a recipient UE to validate the scheduling message as being for semi-persistent scheduling for that UE (instead of dynamic scheduling for another UE).

Figure 5:
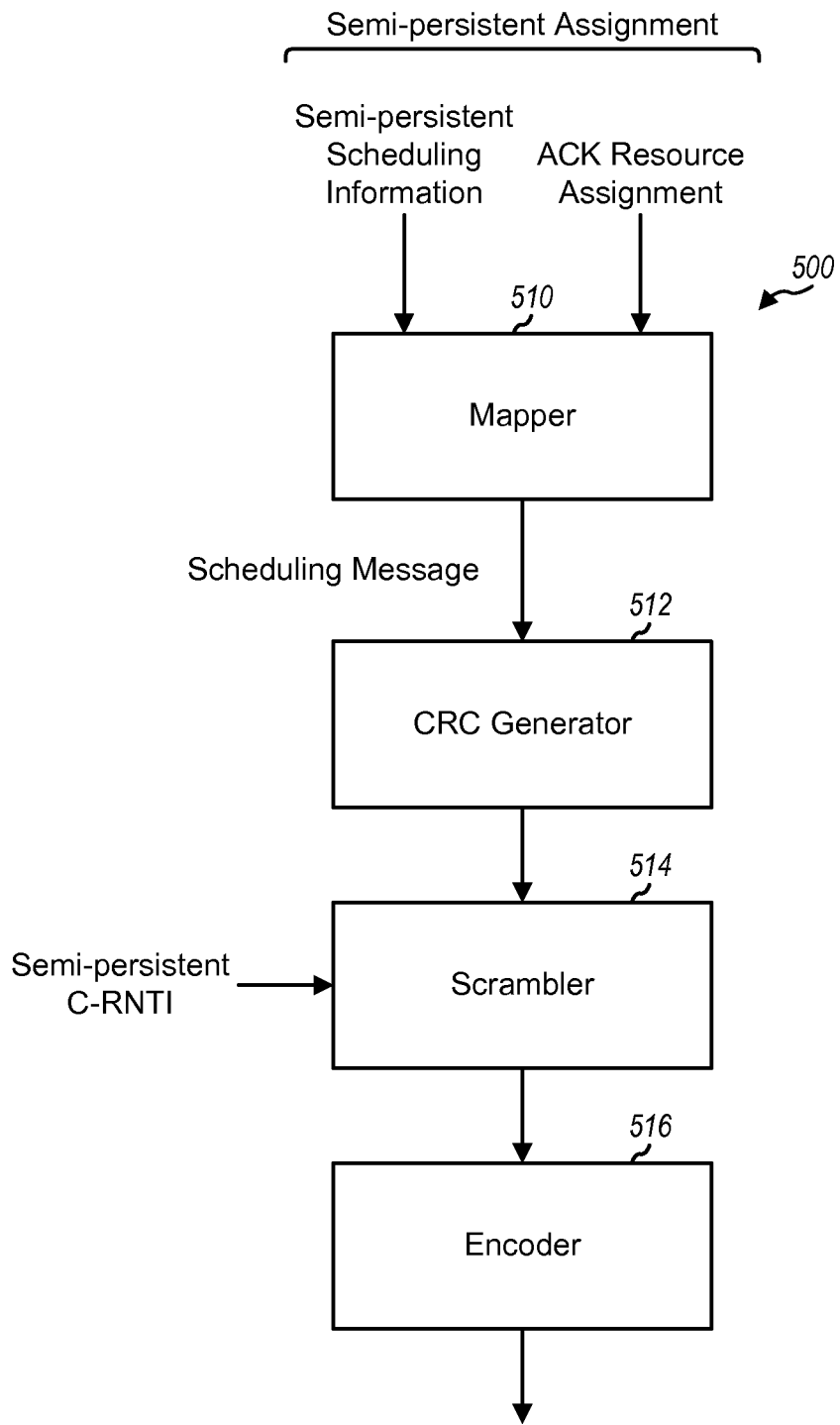
FIG. 5 shows a processing unit for a scheduling message.

FIG. 5 shows a block diagram of a design of a processing unit 500 for generating and processing a scheduling message for semi-persistent scheduling. Within processing unit 500, a mapper 510 may receive a semi-persistent assignment comprising semi-persistent scheduling information (e.g., a resource block assignment, an MCS, etc.) and an ACK resource assignment for a UE. Mapper 510 may map the ACK resource assignment to at least one field of a scheduling message and may map the scheduling information to remaining fields and bits of the scheduling message. Mapper 510 may also set unused fields and/or unused bits of the scheduling message to designated values (e.g., all zeros).

A cyclic redundancy check (CRC) generator 512 may receive the scheduling message from mapper 510, generate a CRC for the message, and append the CRC to the message. A scrambler 514 may receive a semi-persistent C-RNTI for a recipient UE, generate scrambling bits based on the semi-persistent C-RNTI, and scrambles the scheduling message and CRC with the scrambling bits. An encoder 516 may encode the scrambled scheduling message and provide an encoded message, which may be further processed and sent on the PDCCH.

FIG. 5 shows an exemplary design of a processing unit for generating and processing a scheduling message for semi-persistent scheduling. The scheduling message may also be generated and processed in other manners.

FIG. 6 shows a design of a process 600 for receiving data with semi-persistent scheduling. Process 600 may be performed by a UE (as described below) or by some other entity. The UE may receive a semi-persistent assignment that may be valid for multiple transmissions of data (block 612). The semi-persistent assignment may comprise a set of parameters for sending the multiple transmissions of data to the UE, e.g., all or some of the parameters shown in Table 1 and/or other parameters. The semi-persistent assignment may also comprise an assignment of ACK resource. The UE may obtain the assignment of ACK resource from the semi-persistent assignment (block 614). The ACK resource may be assigned to the UE for the multiple transmissions of data. The UE may receive a transmission of data sent in accordance with the semi-persistent assignment (block 616). The UE may process the received transmission and determine ACK information for the transmission of data (block 618). The transmission of data may be for one or more transport blocks, and the ACK information may indicate whether each transport block was decoded correctly or in error by the UE. The UE may send the ACK information with the ACK resource (block 620). The UE may receive additional transmissions of data sent in accordance with the semi-persistent assignment. The UE may send ACK information for these additional transmissions of data with the ACK resource.

In one design of block 612, the UE may receive a scheduling message carrying the semi-persistent assignment. In one design, the UE may detect for the scheduling message for semi-persistent scheduling based on a C-RNTI used for semi-persistent scheduling. In another design, the UE may determine that the scheduling message is for semi-persistent scheduling based on different scrambling, a special bit, etc. The scheduling message may also be used to send scheduling information for a single transmission of data with dynamic scheduling. For dynamic scheduling, the ACK resource may be determined based on the resources (e.g., a starting CCE) used to send the scheduling message.

In one design of block 614, the UE may obtain an index of the ACK resource assigned to the UE from at least one field of the scheduling message. The UE may determine the ACK resource based on the index and a set of configured ACK resources (e.g., configured by RRC). The at least one field may include a new data indicator field, a redundancy version field, an MCS field, a TPC command field, other fields, or any combination thereof.

In one design, for LTE, the UE may receive the semi-persistent assignment on the PDCCH and may receive the transmission of data on the PDSCH. The ACK resource may be for the PUCCH. The UE may also receive the semi-persistent assignment and the transmission of data on other downlink channels and may send ACK information on other uplink channels.

FIG. 7 shows a design of an apparatus 700 for receiving data in a wireless communication system. Apparatus 700 includes a module 712 to receive a semi-persistent assignment valid for multiple transmissions of data for a UE, a module 714 to obtain an assignment of ACK resource from the semi-persistent assignment, with the ACK resource being assigned to the UE for the multiple transmissions of data, a module 716 to receive a transmission of data sent in accordance with the semi-persistent assignment, a module 718 to determine ACK information for the transmission of data, and a module 720 to send the ACK information with the ACK resource.

FIG. 8 shows a design of a process 800 for receiving data with dynamic scheduling and semi-persistent scheduling. Process 800 may be performed by a UE (as described below) or by some other entity. The UE may receive a first scheduling message carrying scheduling information for a single transmission of data with dynamic scheduling (block 812). The UE may receive a first transmission of data sent in accordance with the scheduling information (block 814). The UE may send first ACK information for the first transmission of data with first ACK resource associated with a resource (e.g., a CCE) used to send the first scheduling message (block 816). The first ACK resource may be valid for a single transmission of ACK information.

The UE may also receive a second scheduling message carrying a semi-persistent assignment for multiple transmissions of data with semi-persistent scheduling (block 818). The UE may receive a second transmission of data sent in accordance with the semi-persistent assignment (block 820). The UE may send second ACK information for the second transmission of data with second ACK resource conveyed by the semi-persistent assignment (block 822). The UE may receive additional transmissions of data sent in accordance with the semi-persistent assignment. The UE may send ACK information for these additional transmissions of data with the second ACK resource, which may be valid for multiple transmissions of ACK information.

In one design, the UE may obtain an index of the second ACK resource from at least one field of the second scheduling message. The first and second scheduling messages may have the same format (e.g., as shown in FIG. 4A or 4B) or different formats (e.g., as shown in FIGS. 4A and 4B). These scheduling messages may include the at least one field and one or more additional fields. The at least one field may carry an ACK resource index for semi-persistent scheduling and may carry scheduling information for dynamic scheduling.

In one design, the UE may detect for the first scheduling message based on a first C-RNTI assigned to the UE. The UE may detect for the second scheduling message based on a second C-RNTI assigned to the UE for semi-persistent scheduling. The UE may also determine whether a scheduling message is for dynamic scheduling or semi-persistent scheduling based on other mechanisms, e.g., different scrambling, a special bit in the scheduling message, etc.

In one design, the UE may obtain a first MCS value from the first scheduling message and may process the first transmission of data in accordance with the first MCS value. The first MCS value may be one of a first plurality of MCS values applicable for dynamic scheduling. The UE may obtain a second MCS value from the second scheduling message and may process the second transmission of data in accordance with the second MCS value. The second MCS value may be one of a second plurality of MCS values applicable for semi-persistent scheduling. The second plurality of MCS values may be fewer than the first plurality of MCS values, and the second MCS value may be sent with fewer bits than the first MCS value.

FIG. 9 shows a design of an apparatus 900 for receiving data in a wireless communication system. Apparatus 900 includes a module 912 to receive a first scheduling message carrying scheduling information for a single transmission of data, a module 914 to receive a first transmission of data sent in accordance with the scheduling information, a module 916 to send first ACK information for the first transmission of data with first ACK resource associated with a resource used to send the first scheduling message, a module 918 to receive a second scheduling message carrying a semi-persistent assignment for multiple transmissions of data, a module 920 to receive a second transmission of data sent in accordance with the semi-persistent assignment, and a module 922 to send second ACK information for the second transmission of data with second ACK resource conveyed by the semi-persistent assignment.

FIG. 10 shows a design of a process 1000 for sending data with semi-persistent scheduling. Process 1000 may be performed by a Node B (as described below) or by some other entity. The Node B may assign ACK resource to a UE for semi-persistent scheduling (block 1012). The Node B may send a semi-persistent assignment comprising the ACK resource to the UE (block 1014). The semi-persistent assignment may be valid for multiple transmissions of data. The ACK resource may be assigned to the UE for the multiple transmissions of data. The Node B may send a transmission of data in accordance with the semi-persistent assignment to the UE (block 1016). The Node B may receive ACK information for the transmission of data, with the ACK information being sent by the UE with the ACK resource (block 1018). The Node B may send additional transmissions of data in accordance with the semi-persistent assignment. The Node B may receive ACK information for these additional transmissions of data on the ACK resource.

In one design of block 1014, the Node B may map an index of the ACK resource assigned to the UE to at least one field of a scheduling message. The at least one field may include a new data indicator field, a redundancy version field, an MCS field, a TPC command field, and/or other fields. The Node B may map remaining information for the semi-persistent assignment to remaining fields and bits of the scheduling message. In one design, the Node B may process the scheduling message based on a C-RNTI used for semi-persistent scheduling. The Node B may also indicate that the scheduling message is for semi-persistent scheduling based on other mechanisms. The Node B may send the scheduling message to the UE. The scheduling message may also be used to send scheduling information for dynamic scheduling.

In one design, for LTE, the Node B may send the semi-persistent assignment on the PDCCH and may send the transmission of data on the PDSCH. The ACK resource may be for the PUCCH. The Node B may also send the semi-persistent assignment and the transmission of data on other downlink channels and may receive ACK information on other uplink channels.

FIG. 11 shows a design of an apparatus 1100 for sending data in a wireless communication system. Apparatus 1100 includes a module 1112 to assign ACK resource to a UE, a module 1114 to send a semi-persistent assignment comprising the ACK resource to the UE, the semi-persistent assignment being valid for multiple transmissions of data, the ACK resource being assigned to the UE for the multiple transmissions of data, a module 1116 to send a transmission of data in accordance with the semi-persistent assignment to the UE, and a module 1118 to receive ACK information for the transmission of data, the ACK information being sent by the UE with the ACK resource.

FIG. 12 shows a design of a process 1200 for sending data with dynamic scheduling and semi-persistent scheduling. Process 1200 may be performed by a Node B (as described below) or by some other entity. The Node B may send to a UE a first scheduling message carrying scheduling information for a single transmission of data (block 1212). The Node B may send a first transmission of data in accordance with the scheduling information to the UE (block 1214). The Node B may receive first ACK information for the first transmission of data, with the first ACK information being sent by the UE with first ACK resource associated with a resource (e.g., a CCE) used to send the first scheduling message (block 1216). The first ACK resource may be valid for a single transmission of ACK information.

The Node B may send to the UE a second scheduling message carrying a semi-persistent assignment for multiple transmissions of data (block 1218). The Node B may send a second transmission of data in accordance with the semi-persistent assignment to the UE (block 1220). The Node B may receive second ACK information for the second transmission of data, with the second ACK information being sent by the UE with second ACK resource conveyed by the semi-persistent assignment (block 1222). The Node B may send additional transmissions of data in accordance with the semi-persistent assignment. The Node B may receive ACK information for these additional transmissions of data on the second ACK resource, which may be valid for multiple transmissions of ACK information.

In one design of block 1218, the Node B may map an index of the second ACK resource to at least one field of the second scheduling message. The first and second scheduling messages may have the same format or different formats and may include the at least one field and one or more additional fields. The at least one field may carry an ACK resource index for semi-persistent scheduling and may carry scheduling information for dynamic scheduling.

In one design, the Node B may process (e.g., scramble a CRC for) the first scheduling message with a first C-RNTI assigned to the UE. The Node B may process the second scheduling message with a second C-RNTI assigned to the UE for semi-persistent scheduling. The Node B may also indicate whether a scheduling message is for dynamic scheduling or semi-persistent scheduling based on other mechanisms.

In one design, the Node B may select a first MCS value from a first plurality of MCS values applicable for dynamic scheduling. The Node B may process the first transmission of data in accordance with the first MCS value. The Node B may select a second MCS value from a second plurality of MCS values applicable for semi-persistent scheduling. The Node B may process the second transmission of data in accordance with the second MCS value. The second plurality of MCS values may be fewer than the first plurality of MCS values.

FIG. 13 shows a design of an apparatus 1300 for sending data in a wireless communication system. Apparatus 1300 includes a module 1312 to send to a UE a first scheduling message carrying scheduling information for a single transmission of data, a module 1314 to send a first transmission of data in accordance with the scheduling information to the UE, a module 1316 to receive first ACK information for the first transmission of data on first ACK resource associated with a resource used to send the first scheduling message, a module 1318 to send to the UE a second scheduling message carrying a semi-persistent assignment for multiple transmissions of data, a module 1320 to send a second transmission of data in accordance with the semi-persistent assignment to the UE, and a module 1322 to receive second ACK information for the second transmission of data on second ACK resource conveyed by the semi-persistent assignment.

The modules in FIGS. 7, 9, 11 and 13 may comprise processors, electronics devices, hardware devices, electronics components, logical circuits, memories, software codes, firmware codes, etc., or any combination thereof.

The techniques described herein may allow for efficient assignment of ACK resources for semi-persistent scheduling. For dynamic scheduling, ACK resources may be associated with CCEs carrying scheduling information and may be conveniently assigned to UEs without incurring additional signaling overhead. This is possible when each transmission of data on the PDSCH is scheduled with scheduling information sent on the PDCCH. For semi-persistent scheduling, a semi-persistent assignment may be sent once on the PDCCH with the first transmission of data, and no scheduling information may be sent for subsequent new transmissions of data. In this case, the ACK resources for the subsequent new transmissions of data cannot be associated with the CCEs carrying scheduling information and may be provided by the semi-persistent assignment, as described above.

The techniques described herein allow for dynamic assignment of ACK resources for semi-persistent scheduling using Layer 1 signaling sent on the PUCCH, as described above. The techniques may be more efficient (in terms of overhead) than assigning ACK resources for semi-persistent scheduling using Layer 3 (e.g., RRC) signaling. The techniques may also be more efficient (in terms of resource usage) than statically assigning each active UE with ACK resource for semi-persistent scheduling.

Figure 14:
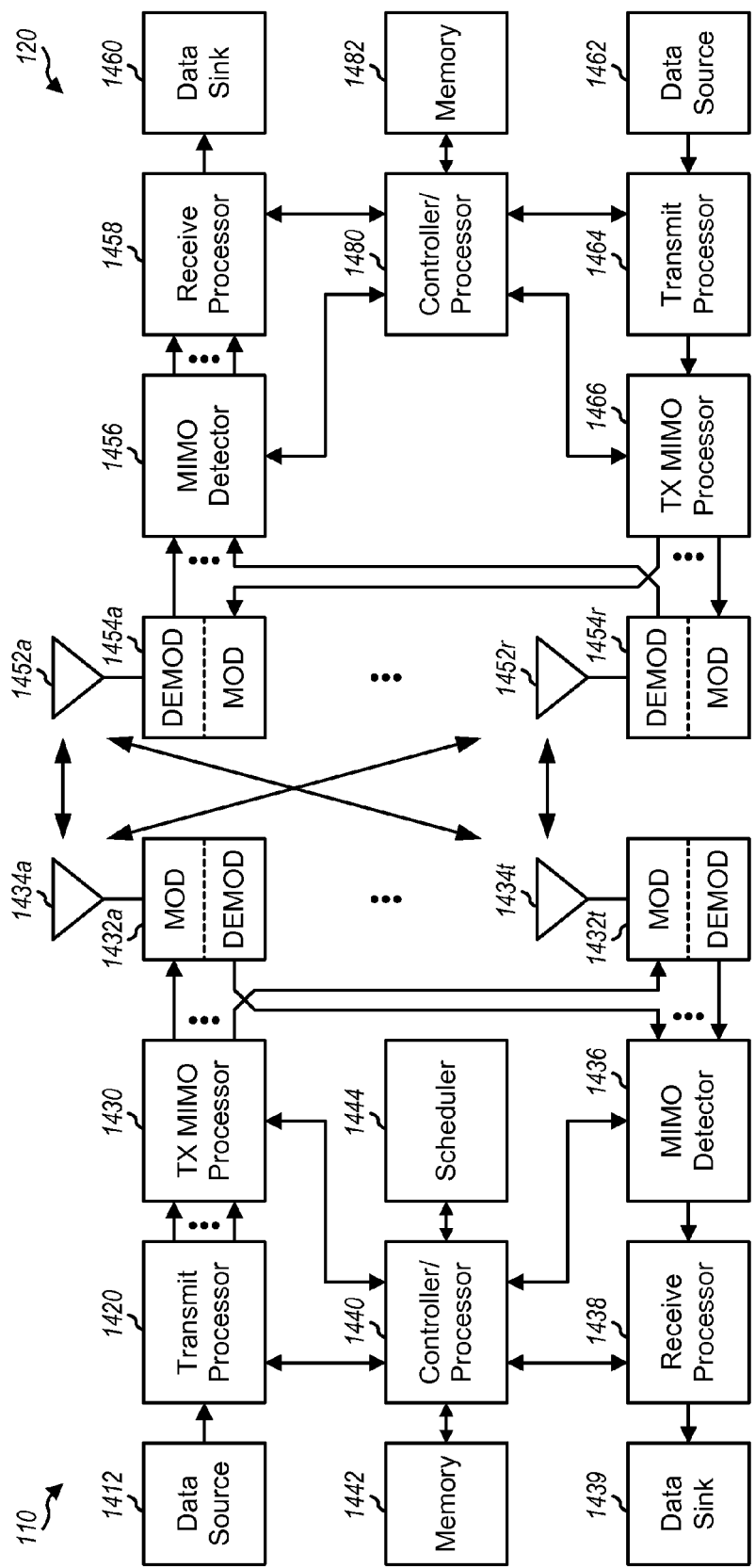
FIG. 14 shows a block diagram of a Node B and a UE.

FIG. 14 shows a block diagram of a design of a Node B 110 and a UE 120, which may be one of the Node Bs and one of the UEs in FIG. 1. In this design, Node B 110 is equipped with T antennas 1434a through 1434t, and UE 120 is equipped with R antennas 1452a through 1452r, where in general T≥1 and R≥1.

At Node B 110, a transmit processor 1420 may receive data (e.g., transport blocks) for one or more UEs from a data source 1412, process the data for each UE based on one or more MCS values for that UE, and provide data symbols for all UEs. Transmit processor 1420 may also process control information (e.g., scheduling messages for dynamic scheduling and semi-persistent scheduling) from a controller/processor 1440 and provide control symbols. A transmit (TX) multiple-input multiple-output (MIMO) processor 1430 may multiplex the data symbols, the control symbols, and/or pilot symbols. TX MIMO processor 1430 may perform spatial processing (e.g., precoding) on the multiplexed symbols, if applicable, and provide T output symbol streams to T modulators (MODs) 1432a through 1432t. Each modulator 1432 may process a respective output symbol stream (e.g., for OFDM) to obtain an output sample stream. Each modulator 1432 may further process (e.g., convert to analog, amplify, filter, and upconvert) the output sample stream to obtain a downlink signal. T downlink signals from modulators 1432a through 1432t may be transmitted via T antennas 1434a through 1434t, respectively.

At UE 120, antennas 1452a through 1452r may receive the downlink signals from Node B 110 and provide received signals to demodulators (DEMODs) 1454a through 1454r, respectively. Each demodulator 1454 may condition (e.g., filter, amplify, downconvert, and digitize) a respective received signal to obtain input samples. Each demodulator 1454 may further process the input samples (e.g., for OFDM) to obtain received symbols. A MIMO detector 1456 may obtain received symbols from all R demodulators 1454a through 1454r, perform MIMO detection on the received symbols if applicable, and provide detected symbols. A receive processor 1458 may process (e.g., demodulate, deinterleave, and decode) the detected symbols, provide decoded data for UE 120 to a data sink 1460, and provide decoded control information to a controller/processor 1480.

On the uplink, at UE 120, data from a data source 1462 and control information (e.g., ACK information, etc.) from controller/processor 1480 may be processed by a transmit processor 1464, precoded by a TX MIMO processor 1466 if applicable, conditioned by modulators 1454a through 1454r, and transmitted to Node B 110. At Node B 110, the uplink signals from UE 120 may be received by antennas 1434, conditioned by demodulators 1432, processed by a MIMO detector 1436 if applicable, and further processed by a receive processor 1438 to obtain the data and control information transmitted by UE 120.

Controllers/processors 1440 and 1480 may direct the operation at Node B 110 and UE 120, respectively. Processor 1480 and/or other processors and modules at UE 120 may perform or direct process 600 in FIG. 6, process 800 in FIG. 8, and/or other processes for the techniques described herein. Processor 1440 and/or other processors and modules at Node B 110 may perform or direct process 1000 in FIG. 10, process 1200 in FIG. 12, and/or other processes for the techniques described herein. Transmit processor 1420 may implement processing unit 500 in FIG. 5. Memories 1442 and 1482 may store data and program codes for Node B 110 and UE 120, respectively. A scheduler 1444 may schedule UEs for downlink and/or uplink transmission and may provide assignments of resources (e.g., ACK resources) for the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication in a user equipment (UE), comprising:
receiving a semi-persistent assignment for the (UE), wherein the semi-persistent assignment is valid for multiple transmissions of data and conveys, in a transmit power control (TPC) field of the semi-persistent assignment, an assignment of an acknowledgement (ACK) resource for sending ACK information for a transmission of data;
obtaining the assignment of the ACK resource from the TPC field of the semi-persistent assignment, the ACK resource being assigned to the UE for the multiple transmissions of data;
receiving the transmission of data sent in accordance with the semi-persistent assignment;
determining the ACK information for the transmission of data; and
sending the ACK information with the assigned ACK resource.

2. The method of claim 1, wherein the obtaining the assignment of the ACK resource comprises:
obtaining an index of the ACK resource from the semi-persistent assignment; and
determining the ACK resource based on the index and a set of configured ACK resources.

3. The method of claim 1, wherein the obtaining the assignment of the ACK resource comprises:
obtaining an index of the ACK resource from at least one field of a scheduling message carrying the semi-persistent assignment; and
determining the ACK resource based on the index.

4. The method of claim 3, wherein the at least one field comprises at least one of a new data indicator field, a redundancy version field, a modulation and coding scheme (MCS) field, or a combination thereof.

5. The method of claim 3, wherein the scheduling message is also used to send scheduling information for a single transmission of data with dynamic scheduling.

6. The method of claim 1, wherein the receiving the semi-persistent assignment comprises:
detecting for a scheduling message based on a cell radio network temporary identifier (C-RNTI) used for semi-persistent scheduling; and
obtaining the semi-persistent assignment from the scheduling message.

7. The method of claim 1, wherein the semi-persistent assignment is received on a physical downlink control channel (PDCCH) and the transmission of data is received on a physical downlink shared channel (PDSCH), and wherein the ACK resource is for a physical uplink control channel (PUCCH).

8. An apparatus for wireless communication, comprising:
at least one processor configured:
to receive a semi-persistent assignment for a user equipment (UE), wherein the semi-persistent assignment is valid for multiple transmissions of data and conveys, in a transmit power control (TPC) field of the semi-persistent assignment, an assignment of an acknowledgement (ACK) resource for sending ACK information for a transmission of data,
to obtain the assignment of the ACK resource from the TPC field of the semi-persistent assignment, the ACK resource being assigned to the UE for the multiple transmissions of data,
to receive the transmission of data sent in accordance with the semi-persistent assignment,
to determine the ACK information for the transmission of data, and
to send the ACK information with the assigned ACK resource; and
a memory coupled to the at least one processor.

9. The apparatus of claim 8, wherein the at least one processor is configured to obtain an index of the ACK resource from at least one field of a scheduling message carrying the semi-persistent assignment and to determine the ACK resource based on the index, and wherein the at least one field comprises at least one of a new data indicator field, a redundancy version field, a modulation and coding scheme (MCS) field, or a combination thereof.

10. The apparatus of claim 8, wherein the at least one processor is configured to detect for a scheduling message based on a cell radio network temporary identifier (C-RNTI) used for semi-persistent scheduling, and to obtain the semi-persistent assignment from the scheduling message.

11. An apparatus for wireless communication, comprising:
means for receiving a semi-persistent assignment for a user equipment (UE), wherein the semi-persistent assignment is valid for multiple transmissions of data and conveys, in a transmit power control (TPC) field of the semi-persistent assignment, an assignment of an acknowledgement (ACK) resource for sending ACK information for a transmission of data;
means for obtaining the assignment of the ACK resource from the TPC field of the semi-persistent assignment, the ACK resource being assigned to the UE for the multiple transmissions of data;
means for receiving the transmission of data sent in accordance with the semi-persistent assignment;
means for determining the ACK information for the transmission of data; and
means for sending the ACK information with the assigned ACK resource.

12. The apparatus of claim 11, wherein the means for obtaining the assignment of the ACK resource comprises:
means for obtaining an index of the ACK resource from at least one field of a scheduling message carrying the semi-persistent assignment, the at least one field comprising at least one of a new data indicator field, a redundancy version field, a modulation and coding scheme (MCS) field, or a combination thereof; and
means for determining the ACK resource based on the index.

13. The apparatus of claim 11, wherein the means for receiving the semi-persistent assignment comprises:
means for detecting for a scheduling message based on a cell radio network temporary identifier (C-RNTI) used for semi-persistent scheduling; and
means for obtaining the semi-persistent assignment from the scheduling message.

14. A computer program product, comprising:
a non-transitory computer-readable medium comprising:
code for causing at least one computer to receive a semi-persistent assignment for a user equipment (UE), wherein the semi-persistent assignment is valid for multiple transmissions of data and conveys, in a transmit power control (TPC) field of the semi-persistent assignment, an assignment of an acknowledgement (ACK) resource for sending ACK information for a transmission of data;

code for causing the at least one computer to obtain the assignment of the ACK resource from the TPC field of the semi-persistent assignment, the ACK resource being assigned to the UE for the multiple transmissions of data;

code for causing the at least one computer to receive the transmission of data sent in accordance with the semi-persistent assignment;

code for causing the at least one computer to determine the ACK information for the transmission of data; and code for causing the at least one computer to send the ACK information with the assigned ACK resource.

15. A method for wireless communication in a user equipment (UE), comprising:

receiving a first scheduling message carrying scheduling information for a single transmission of data;

receiving a first transmission of data sent in accordance with the scheduling information;

sending first acknowledgement (ACK) information for the first transmission of data with a first ACK resource associated with a resource used to send the first scheduling message;

receiving a second scheduling message carrying a semi-persistent assignment for multiple transmissions of data, wherein the semi-persistent assignment conveys, in a transmit power control (TPC) field of the semi-persistent assignment, a second ACK resource for sending second ACK information for a second transmission of data;

receiving the second transmission of data sent in accordance with the semi-persistent assignment; and sending the second ACK information for the second transmission of data with the assigned second ACK resource conveyed in the TPC field of the semi-persistent assignment.

16. The method of claim 15, further comprising:

obtaining an index of the second ACK resource from at least one field of the second scheduling message, the at least one field carrying an ACK resource index for semi-persistent scheduling and carrying scheduling information for dynamic scheduling.

17. The method of claim 15, further comprising:

detecting for the first scheduling message based on a first cell radio network temporary identifier (C-RNTI) assigned to the UE; and detecting for the second scheduling message based on a second C-RNTI assigned to the UE for semi-persistent scheduling.

18. The method of claim 15, further comprising:

obtaining a first modulation and coding scheme (MCS) value from the first scheduling message, the first MCS value being one of a first plurality of MCS values applicable for dynamic scheduling;

processing the first transmission of data in accordance with the first MCS value;

obtaining a second MCS value from the second scheduling message, the second MCS value being one of a second plurality of MCS values applicable for semi-persistent scheduling, the second plurality of MCS values being fewer than the first plurality of MCS values; and processing the second transmission of data in accordance with the second MCS value.

19. The method of claim 15, wherein the first ACK resource is valid for a single transmission of ACK information, and wherein the second ACK resource is valid for multiple transmissions of ACK information.

20. An apparatus for wireless communication, comprising:

at least one processor configured:

to receive a first scheduling message carrying scheduling information for a single transmission of data, to receive a first transmission of data sent in accordance with the scheduling information, to send first acknowledgement (ACK) information for the first transmission of data with a first ACK resource associated with a resource used to send the first scheduling message, to receive a second scheduling message carrying a semi-persistent assignment for multiple transmissions of data, wherein the semi-persistent assignment conveys, in a transmit power control (TPC) field of the semi-persistent assignment, a second ACK resource for sending second ACK information for a second transmission of data, to receive the second transmission of data sent in accordance with the semi-persistent assignment, and to send the second ACK information for the second transmission of data with the assigned second ACK resource conveyed in the TPC field of the semi-persistent assignment; and a memory coupled to the at least one processor.

21. The apparatus of claim 20, wherein the at least one processor is configured to obtain an index of the second ACK resource from at least one field of the second scheduling message, the at least one field carrying an ACK resource index for semi-persistent scheduling and carrying scheduling information for dynamic scheduling.

22. The apparatus of claim 20, wherein the at least one processor is configured to detect for the first scheduling message based on a first cell radio network temporary identifier (C-RNTI) assigned to a user equipment (UE), and to detect for the second scheduling message based on a second C-RNTI assigned to the UE for semi-persistent scheduling.

23. A method for wireless communication in a node B, comprising:

assigning an acknowledgement (ACK) resource to a user equipment (UE);

sending a semi-persistent assignment comprising the ACK resource to the UE, the semi-persistent assignment being valid for multiple transmissions of data, the ACK resource being assigned to the UE for the multiple transmissions of data and being conveyed in a transmit power control (TPC) field of the semi-persistent assignment;

sending a transmission of data in accordance with the semi-persistent assignment to the UE; and receiving ACK information for the transmission of data, the ACK information being sent by the UE with the assigned ACK resource.

24. The method of claim 23, wherein the sending the semi-persistent assignment comprises:

mapping an index of the ACK resource to at least one field of a scheduling message;

mapping remaining information for the semi-persistent assignment to remaining fields and bits of the scheduling message; and sending the scheduling message to the UE.

25. The method of claim 24, wherein the at least one field comprises at least one of a new data indicator field, a redundancy version field, a modulation and coding scheme (MCS) field, or a combination thereof.

26. The method of claim 24, wherein the scheduling message is also used to send scheduling information for a single transmission of data with dynamic scheduling.

27. The method of claim 23, wherein the sending the semi-persistent assignment comprises:
generating a scheduling message carrying the semi-persistent assignment; and
processing the scheduling message based on a cell radio network temporary identifier (C-RNTI) used for semi-persistent scheduling.

28. The method of claim 23, wherein the semi-persistent assignment is sent on a physical downlink control channel (PDCCH) and the transmission of data is sent on a physical downlink shared channel (PDSCH), and wherein the ACK resource is for a physical uplink control channel (PUCCH).

29. An apparatus for wireless communication, comprising:
at least one processor configured:
to assign an acknowledgement (ACK) resource to a user equipment (UE),
to send a semi-persistent assignment comprising the ACK resource to the UE, the semi-persistent assignment being valid for multiple transmissions of data, the ACK resource being assigned to the UE for the multiple transmissions of data and being conveyed in a transmit power control (TPC) field of the semi-persistent assignment,
to send a transmission of data in accordance with the semi-persistent assignment to the UE, and
to receive ACK information for the transmission of data, the ACK information being sent by the UE with the assigned ACK resource; and
a memory coupled to the at least one processor.

30. The apparatus of claim 29, wherein the at least one processor is configured to map an index of the ACK resource to at least one field of a scheduling message, the at least one field comprising at least one of a new data indicator field, a redundancy version field, a modulation and coding scheme (MCS) field, or a combination thereof, to map remaining information for the semi-persistent assignment to remaining fields and bits of the scheduling message, and to send the scheduling message to the UE.

31. The apparatus of claim 29, wherein the at least one processor is configured to generate a scheduling message carrying the semi-persistent assignment, and to process the scheduling message based on a cell radio network temporary identifier (C-RNTI) used for semi-persistent scheduling.

32. A method for wireless communication in a node B, comprising:
sending to a user equipment (UE) a first scheduling message carrying scheduling information for a single transmission of data;
sending a first transmission of data in accordance with the scheduling information to the UE;
receiving first acknowledgement (ACK) information for the first transmission of data, the first ACK information being sent by the UE with a first ACK resource associated with a resource used to send the first scheduling message;
sending to the UE a second scheduling message carrying a semi-persistent assignment for multiple transmissions of data, wherein the semi-persistent assignment conveys, in a transmit power control (TPC) field of the semi-persistent assignment, a second ACK resource for sending second ACK information for a second transmission of data;
sending the second transmission of data in accordance with the semi-persistent assignment to the UE; and
receiving the second ACK information for the second transmission of data, the second ACK information being sent by the UE with the assigned second ACK resource conveyed in the TPC field of the semi-persistent assignment.

33. The method of claim 32, further comprising:
mapping an index of the second ACK resource to at least one field of the second scheduling message, the at least one field carrying an ACK resource index for semi-persistent scheduling and carrying scheduling information for dynamic scheduling.

34. The method of claim 32, further comprising:
processing the first scheduling message with a first cell radio network temporary identifier (C-RNTI) assigned to the UE; and
processing the second scheduling message with a second C-RNTI assigned to the UE for semi-persistent scheduling.

35. The method of claim 32, further comprising:
selecting a first modulation and coding scheme (MCS) value from a first plurality of MCS values applicable for dynamic scheduling;
processing the first transmission of data in accordance with the first MCS value;
selecting a second MCS value from a second plurality of MCS values applicable for semi-persistent scheduling, the second plurality of MCS values being fewer than the first plurality of MCS values; and
processing the second transmission of data in accordance with the second MCS value.

36. The method of claim 32, wherein the first ACK resource is valid for a single transmission of ACK information, and wherein the second ACK resource is valid for multiple transmissions of ACK information.

37. An apparatus for wireless communication, comprising:
at least one processor configured:
to send to a user equipment (UE) a first scheduling message carrying scheduling information for a single transmission of data,
to send a first transmission of data in accordance with the scheduling information to the UE,
to receive first acknowledgement (ACK) information for the first transmission of data on a first ACK resource associated with a resource used to send the first scheduling message,
to send to the UE a second scheduling message carrying a semi-persistent assignment for multiple transmissions of data, wherein semi-persistent assignment conveys, in a transmit power control (TPC) field of the semi-persistent assignment, a second ACK resource for sending second ACK information for a second transmission of data,
to send the second transmission of data in accordance with the semi-persistent assignment to the UE, and
to receive the second ACK information for the second transmission of data on the assigned second ACK resource conveyed in the TPC field of the semi-persistent assignment; and
a memory coupled to the at least one processor.

38. The apparatus of claim 37, wherein the at least one processor is configured to map an index of the second ACK resource to at least one field of the second scheduling message, the at least one field carrying an ACK resource index for semi-persistent scheduling and carrying scheduling information for dynamic scheduling.

39. The apparatus of claim 37, wherein the at least one processor is configured to process the first scheduling message with a first cell radio network temporary identifier (C-RNTI) assigned to the UE, and to process the second scheduling message with a second C-RNTI assigned to the UE for semi-persistent scheduling.

* * * * *